Dec. 10, 1929.  S. HUNT  1,739,145
MACHINE FOR THE MANUFACTURE OF GLASS ARTICLES
Filed Sept. 3, 1927  2 Sheets-Sheet 1
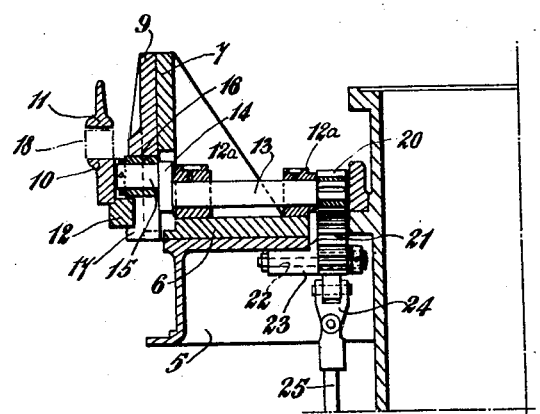
Fig. 1.
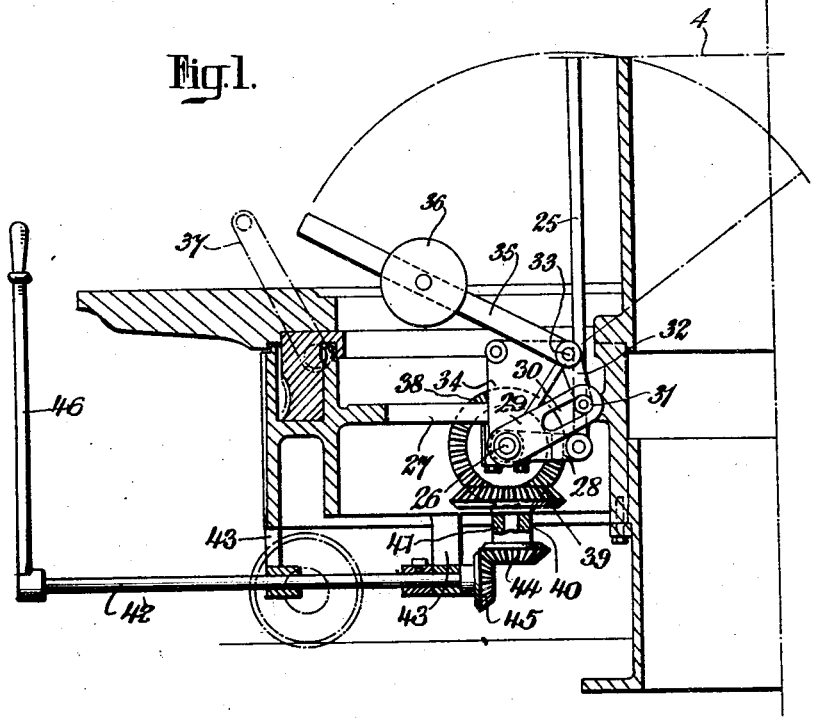
INVENTOR
SYDNEY HUNT,
BY
His ATTORNEYS

INVENTOR
SYDNEY HUNT,

His ATTORNEYS

Patented Dec. 10, 1929

1,739,145

UNITED STATES PATENT OFFICE

SYDNEY HUNT, OF BIRMINGHAM, ENGLAND

MACHINE FOR THE MANUFACTURE OF GLASS ARTICLES

Application filed September 3, 1927, Serial No. 217,445, and in Great Britain June 17, 1927.

This invention relates to machines for the manufacture of glass articles having cams controlling the movements of moulds in opposition to spring or other applied pressure or gravity, and has for its object to provide means for throwing out of and into action the operative parts of such cams whether the machine is working or not, and preferably by means under the control of the machine minder.

According to the present invention, in order to enable the cam to be thrown out of or brought into action it is provided with a section which is adapted to be moved out of or into the way, so that when the follower controlling the movement of the mould in opposition to spring or other applied pressure or gravity reaches this section, it is either not influenced by the cam, or is influenced as the case may be.

The present invention is designed to obviate the necessity of raising the machine and to enable the machine to be drawn back without raising the whole of it, if a breakdown should occur or if for some other reason it should be necessary to draw the machine away from the glass pot when a head is in a position over the pot.

With the ordinary machine as the head will be in the dip position, it is either necessary to raise the whole machine which may be very troublesome as a breakdown often occurs when the electric current is not available or other power for raising the machine, or to stop the machine, which cannot always be done quickly enough.

If the machine continues to move, no harm is done, but supposing that it is desired to stop the dipping of any of the heads without stopping the machine for a short period, the movable section may be thrown out of action in a moment, and the heads will stop dipping while some adjustment is being made.

On the other hand supposing the machine stops or is stopped with the head in the dip position, it is clearly impossible to draw it away from the pot without the parison mould coming into contact with the edge of the pot causing breakage.

It is sometimes necessary to draw the machine away from the pot and with the present invention this can be done by simply lowering the removable section of the cam when the head will automatically rise and the machine can be drawn away without any difficulty and without raising it as a whole.

In the preferred construction the movable cam section is so mounted and arranged that it can be displaced from and restored to its normal position by means under the control of the machine minder, whether the machine is working or not.

In order that the invention may be more clearly understood, it will now be described with reference to a machine for the manufacture of glass articles such as bottles, including a plurality of parison moulds, each of which is carried by means of a lever or levers furnished with a counterbalance weight tending to hold the said mould normally in the raised position, the lowering being effected by means of a vertical cam upon the central fixed column of the machine.

In the usual and known construction this vertical cam is furnished with an upwardly inclined or hump portion in the position where the lowering of the head is to be effected so that a cam follower or roller in connection with the counterbalance weight rides up this slope or hump and causes the dip to take place.

In carrying out the present invention this hump portion of the cam may be formed as an independent section, which can be lowered out of position when it is desired that no dip shall take place. This is shown on the accompanying drawings in which:—

Fig. 1 is a fragmentary sectional elevation of certain portions of a machine for the manufacture of glass articles such as bottles.

Figure 2:
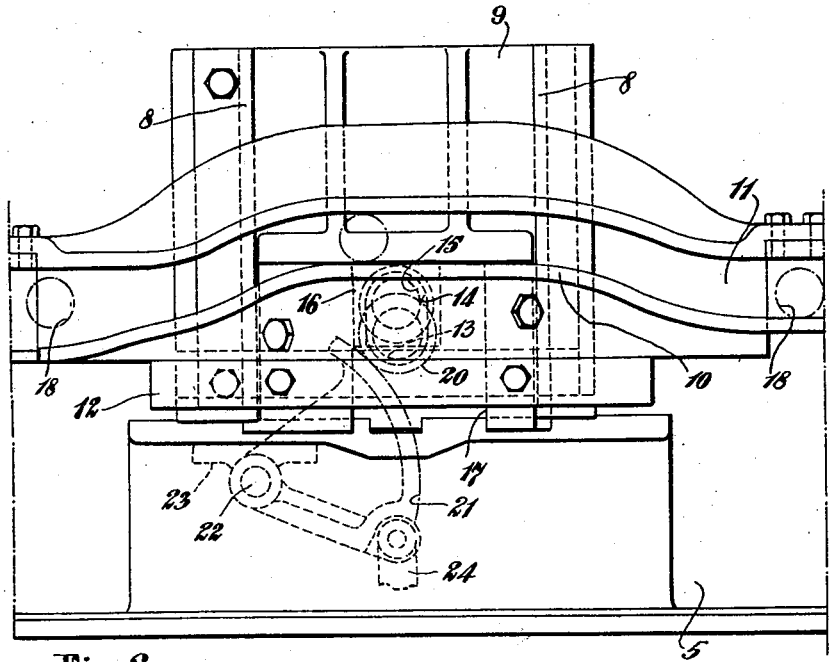
Fig. 2 is a side elevation of the upper portion of Fig. 1 in outside elevation and drawn to a larger scale.
Figure 3:
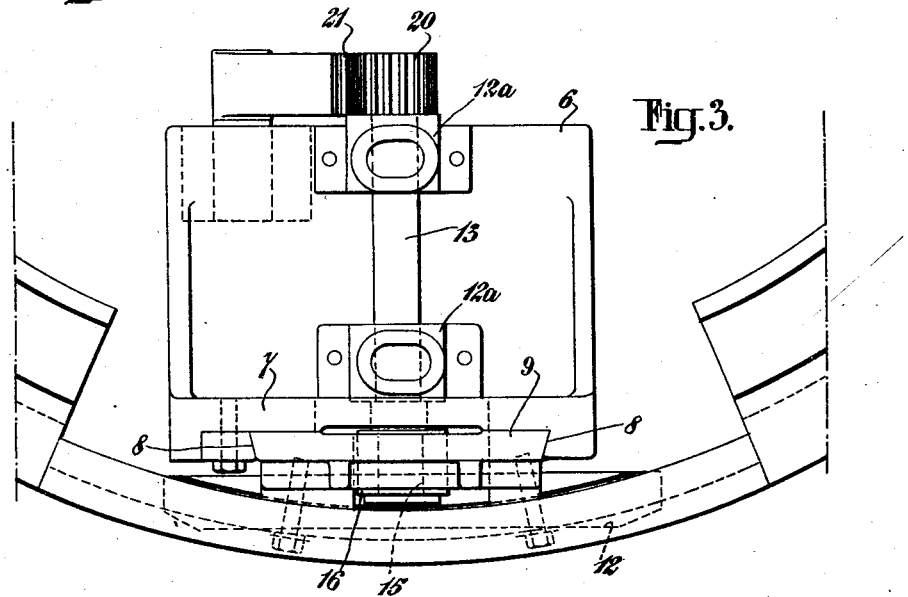
Fig. 3 is a plan of Fig. 2.

In Fig. 1, one-half of a central fixed column 4 of the machine is provided with a spreader casting 5 supporting on its upper surface a horizontal portion 6 of an angle bracket having a vertical portion 7 formed with a vertical dove tailed guideway 8 (see Fig. 2) in which is mounted to move vertically a slide 9 carrying the movable hump section 10 of the cam 11 by means of a steel bar 12 mounted thereon.

The horizontal portion 6 of the before mentioned angle bracket carries bearings 12ᵃ for a horizontal crank shaft 13 the crank 14 of which is provided with a pin 15 co-operating with a bearing 16 carried in a gap 17 in the vertical slide 9, and adapted to have slight lateral movement, the arrangement being such that the whole of the weight of the vertical slide 9, the movable hump portion 10 of the cam and the support therefor 12 is taken by the upper surface of the crank pin bearing 16.

When the movable section of the cam 10 is in the raised position, that is the position in which it operates the cam follower 18, the axis of the crank pin 15 is vertically above the axis of the crank shaft 13, as shown in Figs. 1 and 2, whereas when it is in the lowered position the said pin moves through an angle of 180° and comes vertically below the axis of the shaft.

The crank shaft 13 is provided at the other end with a pinion 20 which meshes with a toothed quadrant 21 mounted upon a spindle 22 carried by a bearing 23 on the before mentioned spreader casting 5. To the quadrant 21 is pivotally attached one pair of jaws of a universal coupling 24, the other pair of jaws being pivotally attached to the upper end of a vertical rod 25, which rod is moved upwards by any suitable mechanism under the control of the machine minder when it is desired to lower the cam section 10, and moved downwards when it is required again to restore the section to its normal position.

One method of operating this rod is shown in Fig. 1 and comprises a shaft 26 suitably mounted in bearings in connection with the lower fixed portion 27 of the machine, the said shaft being in turn operated by means of a hand lever, by power or through any suitable transmission mechanism, not shown in the drawing, which may include universal joints, and be operated from any desired position.

A simple and convenient mechanism for operating the shaft 26 to effect raising or lowering of the rod 25 is illustrated in Figure 1. This mechanism includes a bevel gear 38 fixed to the shaft 26 and in constant meshing relation with a companion bevel gear 39 fixed to a vertical shaft 40 journalled in a bearing 41 on the fixed portion 27 of the frame, a horizontally disposed shaft 42 carried by brackets 43 fixed to the lower portion 27 of the frame, cooperating bevel gears 44 and 45 mounted on the shafts 40 and 42 respectively, and a manually operable lever 46 fixed to the outer end of the shaft. Obviously, power actuating means could be connected to the outer end of the shaft 42 in lieu of the lever 46.

This shaft 26 has connected thereto a lever 28 pivotally connected to the lower end of the before mentioned vertical rod 25. The shaft 26 also carries a link arm 29 the free end of which is provided with a slot 30 in which engages a roller 31 carried by the free end of one arm 32 of another lever pivoted at 33 to a suitable fixed part 34 attached to the framework or casting 27 the other arm 35 of the said lever carrying an adjustable counterbalance weight 36.

When the cam section 10 is in the raised position, that is the position shown in full lines in the drawing, the last described mechanism is in a position in which the counterbalance weight 36 is in the extreme position shown in full lines in Fig. 1, whilst when the cam section 10 is in the lowered position the levers 29 and 32 have been moved to the other side of their dead centre position and the weighted lever 35 comes to its other extreme position, shown by the dot and dash line Fig. 1, and retains them in that position by pressing on the lower face of the slot 30.

With machines of the foregoing description it is usual to mount the same upon a trolley and to provide traversing gear for moving the trolley to and away from the glass tank as required.

It will be understood that should one of the heads be in the lowered position in the glass tank when it is proposed to move the machine away from such tank the head would foul the edge of the tank and serious damage might occur.

In order to prevent the machine being moved away by means of the traversing gear when the movable section 10 of the cam is in the upper position means are provided for preventing the traversing gear being brought into action until the throw over mechanism for lowering the movable cam section has been operated. These means may comprise a stop which prevents the operation of the handle such as 37 (Fig. 1) of the traversing mechanism and in some cases the stop may be constituted by the weighted lever 35 which comes in the same plane as and thereby prevents the handle being turned. When the weighted lever 35 is moved into the position for lowering the cam section, it moves away from the handle 37 of the traversing mechanism which is thus released for action.

If found desirable means may be provided for locking the adjustable cam section in its normal position, such locking means being adapted to be released, when it is desired to bring the movable cam section into its inoperative position. In some cases the locking means may include a bolt or the like, adapted to lock the sliding element, in connection with the movable cam section, to the guideway. The locking mechanism may in some cases be controlled by an electric solenoid, and the arrangement may be such that in the event of the failure of the electric current the parts may be brought into such a position that no damage will occur.

It will be understood that the particular details of construction as to the mounting, and as to the quick lowering and raising and locking of the movable section of the cam before described are given merely by way of example, as many other constructions might be devised, within the scope of the invention, for effecting the same object.

Having now particularly described and ascertained the nature of my said invention and in what manner the same is to be performed, I declare that what I claim is:—

1. In a rotary machine for the manufacture of glass articles, having a fixed central column furnished with a cam for controlling the movements of a counterbalanced parison mould carried by the rotary framework, and causing it to dip into a reservoir for molten glass at appropriately timed intervals, a construction in which the operative portion of the cam which effects the dipping is carried by a slide working in suitable guides in connection with the fixed central column of the machine, the slide being reciprocated by a crank mechanism, the shaft of the crank being rotated by mechanism controlled through appropriate transmission means from an operating device suitably disposed for manipulation by the machine minder.

2. In a rotary machine for the manufacture of glass articles, having a fixed central column furnished with a cam for controlling the movements of a counterbalanced parison mould carried by the rotary framework, and causing it to dip into a reservoir for molten glass at appropriately timed intervals, a construction in which the operative portion of the cam which effects the dipping is carried by a slide working in suitable guides in connection with the fixed central column of the machine, the slide being reciprocated by a crank mechanism, the shaft of the crank being rotated by mechanism controlled through appropriate transmission means from an operating device suitably disposed for manipulation by the machine minder, the said crank being carried by bearings supported by a bracket in fixed relation with the central column of the machine, the bracket also carrying the guides for the vertical slide to which the movable portion of the cam is attached.

3. In a rotary machine for the manufacture of glass articles, having a fixed central column furnished with a cam for controlling the movements of a counterbalanced parison mould carried by the rotary framework, and causing it to dip into a reservoir for molten glass at appropriately timed intervals, a construction in which the operative portion of the cam which effects the dipping is carried by a slide working in suitable guides in connection with the fixed central column of the machine, such slide being reciprocated by means of a crank, the shaft of which is provided with a pinion meshing with a quadrant, which latter is operated from a vertically slidable rod adapted to be actuated through lever mechanism from a shaft under the control of the machine minder.

4. In a rotary machine for the manufacture of glass articles, having a fixed central column furnished with a cam for controlling the movements of a counterbalanced parison mould carried by the rotary framework, and causing it to dip into a reservoir for molten glass at appropriately timed intervals, a construction in which the operative portion of the cam which effects the dipping is carried by a slide working in suitable guides in connection with the fixed central column of the machine, and in which the said slide is provided with a gap, and in which the crank pin carries a bearing block projecting through the gap, so that the upper surface of the block comes beneath and in sliding contact with the upper surface of the gap, and in which the slide carries the movable section of the cam by means of a transverse bar.

5. In a machine for the manufacture of glass articles and of the type having a cam for controlling the movements of parison moulds and causing them to dip into a glass tank in opposition to counterbalance weights tending to oppose such dipping movement; a construction in which an operative portion of the cam is mounted so that it can be moved from an operative to an inoperative position whether the machine is working or not by mechanism under the control of the machine minder operable from any suitable accessible position, such mechanism under the control of the machine minder including a slotted lever mounted on the operating shaft, in a slot in which lever engages a roller mounted at the end of one of the arms of a two armed lever the other arm of which is provided with a counterbalance weight, so that when the weighted arm is moved beyond the dead central position so as to bring pressure to bear on the lower face of the said stop, it holds the operating shaft in one or other of its extreme positions, together with lever or other means for communicating the movements of the operating shaft to the mechanism controlling the movable section of the cam.

In witness whereof I affix my signature.

SYDNEY HUNT.